United States Patent [19]

Inoue

[11] Patent Number: 5,775,407

[45] Date of Patent: Jul. 7, 1998

[54] DUAL ZONE AIR CONDITIONING APPARATUS WITH SEALING PORTIONS ON PARTITION WALL

[75] Inventor: Eiji Inoue, Nagoya, Japan

[73] Assignee: Denso Corporation, Kariya, Japan

[21] Appl. No.: 769,890

[22] Filed: Dec. 19, 1996

[30] Foreign Application Priority Data

Dec. 26, 1995 [JP] Japan ............................. 7-339536

[51] Int. Cl.[6] .................................................. B60H 1/02
[52] U.S. Cl. .................... 165/42; 165/43; 165/203; 237/12.3 A; 237/12.3 B; 454/161
[58] Field of Search ..................... 165/203, 42, 43, 165/41; 237/12.3 A, 12.3 B

[56] References Cited

U.S. PATENT DOCUMENTS

| | | | |
|---|---|---|---|
| 4,420,115 | 12/1983 | Matsushima et al. | 237/12.3 A |
| 4,498,528 | 2/1985 | Jacquet | 454/161 |
| 4,519,302 | 5/1985 | Nilsson et al. | 454/161 |
| 4,582,252 | 4/1986 | Ogihara et al. | 237/12.3 A |
| 4,616,693 | 10/1986 | Dietzsch et al. | 165/41 |
| 5,016,704 | 5/1991 | Ono | 165/43 |
| 5,101,883 | 4/1992 | Kinmartin et al. | 237/12.3 A |

FOREIGN PATENT DOCUMENTS

| | | | |
|---|---|---|---|
| 61-0229609 | 10/1986 | Japan | 237/12.3 A |
| U-63-77808 | 5/1988 | Japan | . |
| Y2-1-31524 | 9/1989 | Japan | . |
| A-3-148324 | 6/1991 | Japan | . |
| A-5-58144 | 3/1993 | Japan | . |

*Primary Examiner*—John K. Ford
*Attorney, Agent, or Firm*—Harness, Dickey & Pierce, PLC

[57] ABSTRACT

Sealing portions protrude from both surfaces of a intermediate plate for partitioning a space in an air conditioning case into a first air passage and a second air passage. When doors in each of the first and second air passages are at positions at which a predetermined air flow path in each of the first and second air passages is closed, the sealing portions contact with the doors to seal gaps between the intermediate plate and each of the doors. Because the sealing portions are integrally molded with the partitioning member, the sealing portions can be easily formed by a die unit.

11 Claims, 8 Drawing Sheets

DUAL ZONE AIR CONDITIONING APPARATUS WITH SEALING PORTIONS ON PARTITION WALL

CROSS REFERENCE TO THE RELATED APPLICATION

This application is based on and claims priority of Japanese Patent Application No. Hei. 7-339536, filed on Dec.26, 1995, the content of which are incorporated herein by reference.

BACKGROUND OF THE INVENTION

1. Field of the Invention

The present invention relates to an air conditioning apparatus capable of independently adjusting each temperature of a first air conditioning zone and a second air conditioning zone in a passenger compartment, and more particularly to the interior structure of an air conditioning case of the air conditioning apparatus.

2. Description of Related Art

Conventionally, there has been proposed an air conditioning apparatus which independently adjusts each temperature of the first air conditioning zone and the second air conditioning zone, as disclosed in JP-A-5-58144. According to this air conditioning apparatus, the partitioning plate is installed in the air conditioning case so as to partition the air passage in the air conditioning case into a first air passage which communicates with the first air conditioning zone in the passenger compartment and a second air passage which communicates with the second air conditioning zone provided in the passenger compartment.

In each of the first and second air passages, there are provided the heater core for heating air, the bypass passage which bypasses the heater core, the air-mixing door for adjusting the amount of air passing through the heater core and the amount of air passing through the bypass passage. The opening degree of each air-mixing door is adjusted independently so that each temperature of air blown into the first air conditioning zone and the second air conditioning zone is adjusted independently.

When each of the air-mixing doors is in the maximum heating state where the door fully opens the heater core and fully closes the bypasses passage, if the gaps between the air-mixing doors and the air conditioning case and the gaps between the air-mixing doors and the partitioning plate are not sealed, air may leak into the bypass passages from each of the above gaps, even though the air-mixing door fully close the bypass passages. Consequently, air having a temperature required in the maximum heating operation cannot be blown.

When each of the air-mixing doors is in the maximum cooling state where the door fully closes the heater core and fully opens the bypass passage, if the gaps are not sealed, air may leak into the bypass passage from the gaps, because the gaps are not sealed. Consequently, air having a temperature required in the maximum cooling operation cannot be blown.

The doors for switching the air outlet modes are installed in each of the first and second air passages in the air conditioning case of the air conditioning apparatus. In order to obtain a required amount of conditioned air in a predetermined air outlet mode, it is necessary to seal the gaps between each of the doors for switching the air outlet modes and the air conditioning case and the gaps between each of the doors for switching the air outlets modes and the partitioning plate.

However, the conventional air conditioning apparatus is not provided with means for sealing the gaps. Consequently, the above-described various problems occur.

In order to solve the above-described problems, it is necessary to seal the gaps. To seal the gaps between each door and the air conditioning case, there may be formed sealing portions protruding from the inner surface of the air conditioning case so as to bring the sealing portions into contact with each door. In this case, the sealing portions may be made of a resin material and integrally molded with the air conditioning case.

To seal the gaps between each door and the partitioning plate, there may be formed sealing portions on the inner surface of the air conditioning case.

Generally, the shape of the air conditioning case is complicated. When the sealing portions are integrally molded with the air conditioning case, it is almost impossible to release the molded air conditioning case from a die unit. If the air conditioning case is divided into a plurality of cases, it is comparatively easy to release the cases from the die unit, however, the number of components or parts of the air conditioning case is increased.

SUMMARY OF THE INVENTION

In view of the above-described problems, it is accordingly an object of the present invention to provide an air conditioning apparatus in which sealing portions for sealing gaps between each door and a partitioning member (partitioning plate) can be easily formed.

In order to achieve the above object, according to the present invention, there is provided a sealing portion protruding from both surfaces of a partitioning member for partitioning an air passage in an air conditioning case into a first air passage and a second air passage. When a door in each of the first and second air passages closes a predetermined air flow path formed in each of the first and second air passages, the sealing portion contacts with the door to seal a gap between the partitioning member and each of the doors.

The sealing portion can be formed easily, because the sealing portion is not formed on the air conditioning case, but is integrally formed with the intermediate plate.

When each of the doors closes respective predetermined air flow paths, the sealing portion contacts with the door, and as a result the gap between the partitioning member and each of the doors is closed by the sealing portion. Accordingly, air can be prevented from leaking from the gap to the predetermined air flow path.

According to the present invention, since the sealing portion is formed on the partitioning member, a rigidity of the partitioning member is improved.

The sealing portion may be integrally molded with the partitioning member.

In this way, it is easy to release the partitioning member with the sealing portion from a die unit after molded, as compared with the case where the sealing portion is formed on the air conditioning case. It is effective in view of reducing the number of the parts and the manufacturing process.

The air conditioning case may include a first case at the first air passage side and a second case at the second air passage side, and the partitioning member is sandwiched between both cases.

In this way, the partitioning member can be easily attached to and detached from the air conditioning case.

Accordingly, the air conditioning apparatus of the present invention can be employed to independently adjust the temperatures of the first and second air conditioning zones, by attaching the partitioning member on the air conditioning case. Further, the air conditioning apparatus can be also employed to adjust both temperatures in the same way, by detaching the partitioning member from the air conditioning case.

Further, there may be provided a fitting wall protruding from both surfaces of the partitioning member, and a groove into which the fitting wall is fit is formed on each of the first and second cases. The partitioning member is sandwiched between both cases, while the fitting wall of the partitioning member is fit into the groove.

In this way, since the fitting wall is fit into the groove, while the partitioning member is sandwiched between the first and second cases, the partitioning member and the first and second cases can be fixedly positioned to each other easily.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EMBODIMENTS

With reference to FIGS. 1 to 8, an embodiment in which the present invention is applied to an air conditioning apparatus for independently controlling each temperature of the space (first air conditioning zone) at a driver's seat side of a passenger compartment and the space (second air conditioning zone) at a passenger's seat side of the passenger compartment will be described.

Figure 1:
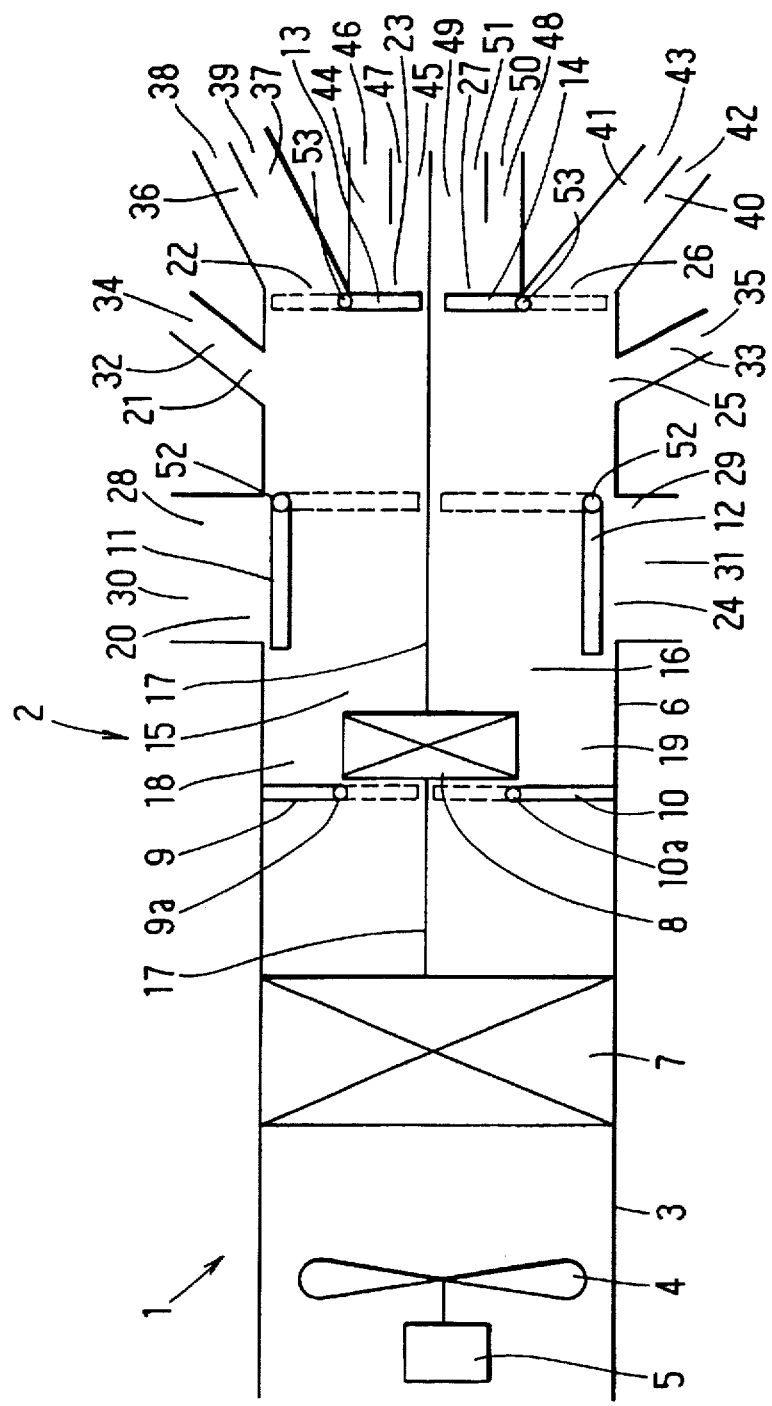
FIG. 1 is a block diagram showing a schematic entire construction of an air conditioning apparatus according to an embodiment of the present invention.

As shown in FIG. 1, the air conditioning apparatus in this embodiment generally includes a blower unit 1 and an air conditioning unit 2.

The blower unit 1 includes a blower case 3 made of polypropylene, a fan 4 for blowing air installed in the blower case 3, and a blower motor 5 for driving the fan 4. Inside air or outside air is sucked to the blower case 3 by the rotation of the fan 4. The inside air or the outside air is discharged from the blower case 3 into the passenger compartment through the air conditioning unit 2.

The air conditioning unit 2 includes an air conditioning case 6, an evaporator 7, a heater core 8, a first air-mixing door 9 (first door), a second air-mixing door 10 (second door) ; a first defroster door 11 (first door), a second defroster door 12 (second door), a first face/foot switching door 13 (first door), a second face/foot switching door 14 (second door), and an intermediate plate 17 (partitioning member) for partitioning an air passage positioned at the downstream air side of the evaporator 7 in the air conditioning case 6, into a first air passage 15 communicating with the space at the driver's seat side and a second air passage 16 communicating with the space at the passenger's seat side. The air conditioning case 6 and the intermediate plate 17 are made of polypropylene.

The evaporator 7 is a cooling heat exchanger which cools the air in the air conditioning case 6 by the evaporation action of refrigerant flowing therein. The refrigerant cycle of the air conditioning apparatus is formed by the evaporator 7, a compressor (not shown) which compresses refrigerant when the engine driving force of the vehicle is transmitted thereto, a condenser (not shown), and an expansion valve (not shown).

The heater core 8 located at a downstream air side of the evaporator 7 is a heating heat exchanger which re-heats cool air supplied thereto from the evaporator 7, by utilizing engine-cooling water flowing therein as the heat source. As will be described later, the heater core 8 is provided so as to pass through the intermediate plate 17 and disposed over both the first air passage 15 and the second air passage 16.

A first bypass passage 18 and a second bypass passage 19 through which cool air supplied from the evaporator 7 bypasses the heater core 8 are formed in the first air passage 15 and the second air passage 16, respectively.

The first air-mixing door 9 adjusts a ratio between an amount of cool air passing through the heater core 8 and an amount of cool air passing through the first bypass passage 18. When the first air-mixing door 9 is in a maximum heating state where the first bypass 18 is fully closed, as shown by the solid line in FIG. 1, all the cool air passes through the heater core 8. On the other hand, when the first air-mixing door 9 is in a maximum cooling state where the heater core 8 is fully closed, as shown by the broken line in FIG. 1, all the cool air passes through the first bypass passage 18.

The second air-mixing door 10 adjusts a ratio between an amount of the cool air passing through the heater core 8 and an amount of cool air passing through the second bypass 19. When the second air-mixing door 10 is in a maximum heating state where the second bypass passage 19 is fully closed, as shown by the solid line in FIG. 1, all the cool air passes through the heater core 8. On the other hand, when the second air-mixing door 10 is at a maximum cooling state where the heater core 8 is fully closed, as shown by the broken line in FIG. 1, all the cool air passes through the second bypass 19.

A shaft 9a of the first air-mixing door 9 is separate from a shaft 10a of the second air-mixing door 10 so that the first air-mixing door 9 and the second air-mixing door 10 are driven independently of each other. In this way, both temperatures of the space at the driver's seat side and the space at the passenger's seat side can be controlled independently of each other.

A first defroster opening portion 20, a first side face opening portion 21, a first face opening portion 22, and a first foot opening portion 23 are formed at a downstream air side of the first air passage 15. Similarly, a second defroster opening portion 24, a second side face opening portion 25, a second face opening portion 26, and a second foot opening portion 27 are formed at a downstream air side of the second air passage 16.

A first defroster duct 28 and a second defroster duct 29 are connected with the first defroster opening portion 20 and the second defroster opening portion 24, respectively. Conditioned air introduced into the first defroster duct 28 and the second defroster duct 29 is blown out toward the inner surface of the windshield of the passenger compartment from a first defroster air outlet 30 and a second defroster air outlet 31 located at the downstream air ends of the first defroster duct 28 and the second defroster duct 29, respectively.

A side face duct 32 and a second side face duct 33 are connected with the first side face opening portion 21 and the second side face opening portion 25, respectively. Conditioned air introduced into the side face duct 32 and the second side face duct 33 is blown out toward the side windshields at the driver's seat side and at the passenger's seat side from a first side face air outlet 34 and a second side face air outlet 35 located at the downstream air ends of the side face duct 32 and the second side face duct 33, respectively.

The first face opening portion 22 is connected with a first center face duct 36 and a first rear face duct 37. Conditioned air introduced into the first center face duct 36 is blown out toward the upper half of a driver seated on the driver's seat from a first center face air outlet 38 located at the downstream air end of the first center face duct 36. Conditioned air introduced into the first rear face duct 37 is blown out toward an upper half of a passenger seated on the rear right seat from a first rear face air outlet 39 located at the downstream air end of the first rear face duct 37.

The second face opening portion 26 is connected with a second center face duct 40 and a second rear face duct 41. Conditioned air introduced into the second center face duct 40 is blown out toward an upper half of a person seated on the passenger's seat from a second center face air outlet 42 located at the downstream end of the second center face duct 40 in the air flow direction. Conditioned air introduced into the second rear face duct 41 is blown out toward an upper half of a passenger seated on the rear left seat from a second rear face air outlet 43 located at the downstream air end of the second rear face duct 41.

The first foot opening portion 23 is connected with a first front foot duct 44 and a first rear foot duct 45. Conditioned air introduced into the first front foot duct 44 is blown out toward feet of the driver seated on the driver's seat from a first front foot air outlet 46 located at the downstream air end of the first front foot duct 44. Conditioned air introduced into the first rear foot duct 45 is blown out toward feet of the passenger seated on the rear right seat from a first rear foot air outlet 47 located at the downstream air end of the first rear foot duct 45.

The second foot opening portion 27 is connected with a second front foot duct 48 and a second rear foot duct 49. Conditioned air introduced into the second front foot duct 48 is blown out toward feet of the passenger seated on the passenger's seat from a second front foot air outlet 50 located at the downstream air end of the second front foot duct 48. Conditioned air introduced into the second rear foot duct 49 is blown out toward feet of the passenger seated on the rear left seat from a second rear foot air outlet 51 located at the downstream air end of the second rear foot duct 49.

The first defroster door 11, the second defroster door 12, the first face/foot switching door 13, and the second face/foot switching door 14 are positioned at the upstream air side of the first defroster opening portion 20, the second defroster opening portion 24, first face opening portion 22 and first foot opening portion 23, and the second face opening portion 26 and the second foot opening portion 27, respectively.

When the first defroster door 11 is at the position shown by the solid line of FIG. 1, the first defroster opening portion 20 is fully closed. When the second defroster door 12 is at the position shown by the solid line of FIG. 1, the second defroster opening portion 24 is fully closed. When the first defroster door 11 is at the position shown by the broken line of FIG. 1, the first defroster opening portion 20 is fully opened to prevent air from flowing into the first face opening portion 22 and the first foot opening portion 23. When the second defroster door 12 is at the position shown by the broken line of FIG. 1, the second defroster opening portion 24 is fully closed to prevent air from flowing into the second face opening portion 26 and the second foot opening portion 27. Even when the first defroster door 11 and the second defroster door 12 are at the position shown by the broken lines of FIG. 1, respectively, air flows into the first side face duct 32 and the second side face duct 33 through a duct (not shown) in FIG. 1, respectively.

When the first face/foot switching door 13 is at the position shown by the solid line of FIG. 1, air flows into the first face opening portion 22, however, air is prevented from flowing into the first foot opening portion 23. When the second face/foot switching door 14 is at the position shown by the solid line of FIG. 1, air flows into the second face opening portion 26, however, air is prevented from flowing into the second foot opening portion 27. When the first face/foot switching door 13 is at the position shown by the broken line of FIG. 1, air is prevented from flowing into the first face opening portion 22, however, air flows into the first foot opening portion 23. When the second face/foot switching door 14 is at the position shown by the broken line of FIG. 1, air is prevented from flowing into the second face opening portion 26, however, air flows into the second foot opening portion 27.

The first defroster door 11 and the second defroster door 12 are rotated with a shaft 52, and the first face/foot switching door 13 and the second face/foot switching door 14 are rotated with a shaft 53. Accordingly, the driver's seat side and the passenger's seat side have the same air outlet mode.

Figure 2:
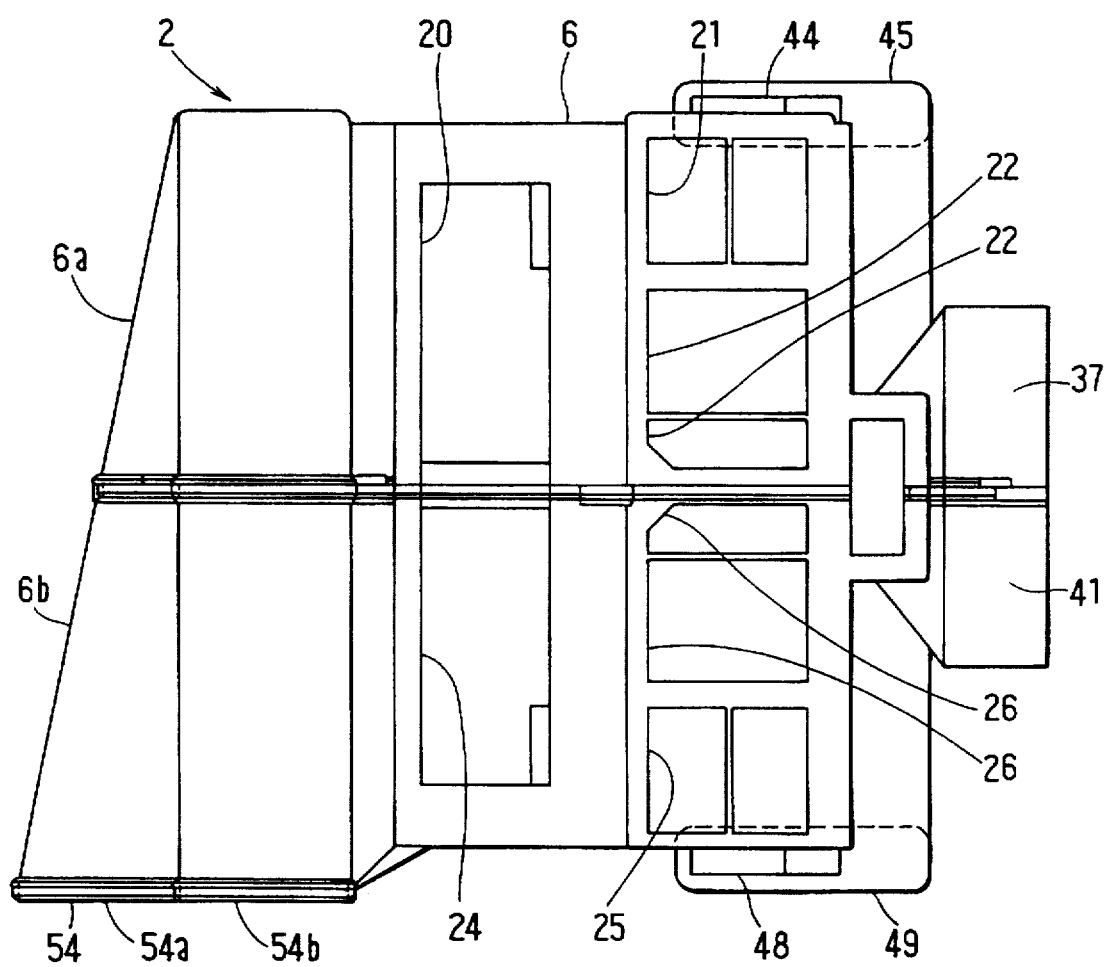
FIG. 2 is a plan view showing the air conditioning unit according to the embodiment.
Figure 3:
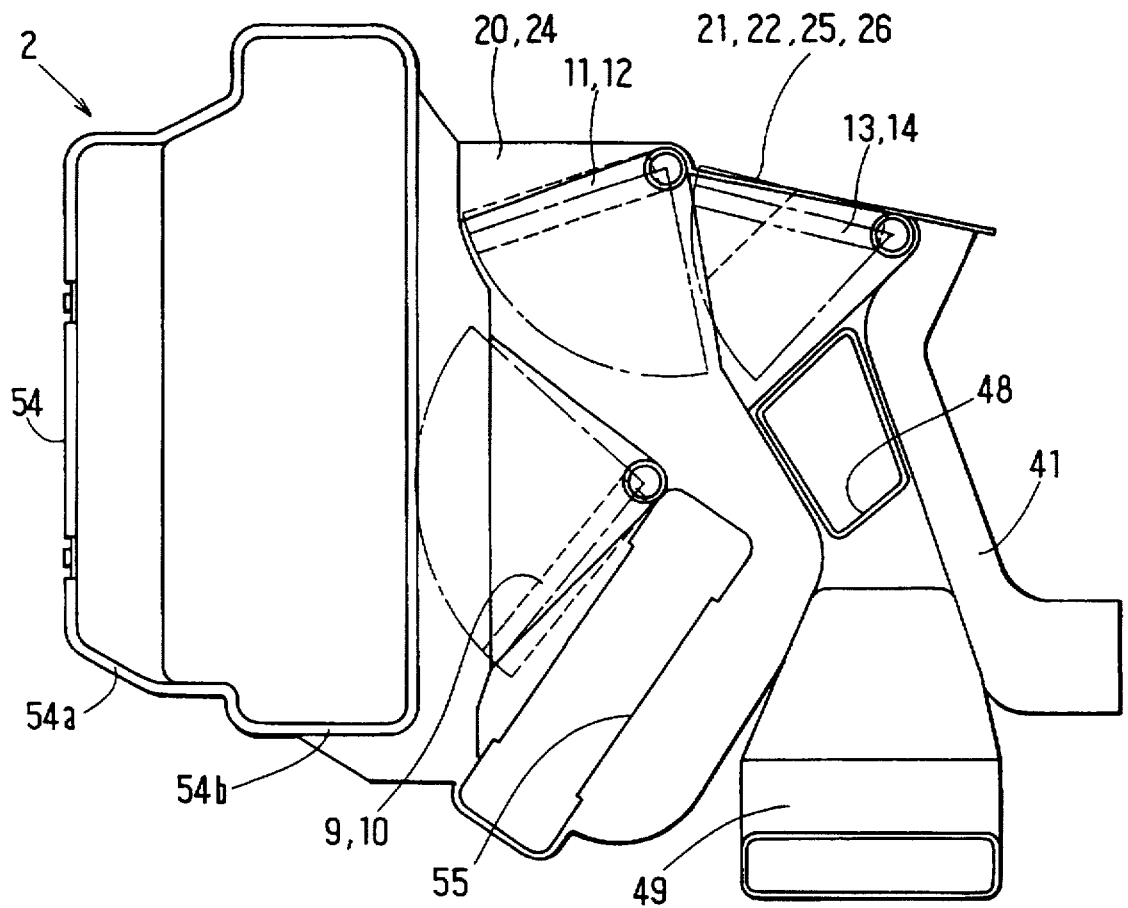
FIG. 3 is a front view showing the air conditioning unit.

The construction of the air conditioning unit 2 is shown in FIGS. 2 and 3 more specifically. FIG. 2 is a plan view showing the air conditioning unit 2. FIG. 3 is a front view showing the air conditioning unit 2.

The air conditioning case 6 includes a right-hand case 6a and a left-hand case 6b. A first opening portion 54 is formed on the left-hand case 6b. The blower unit 1 shown in FIG. 1 is connected with an opening portion 54a of the first opening portion 54. The evaporator 7 is inserted into the air conditioning case 6 from an opening portion 54b for receiving the evaporator, of the first opening portion 54. After the evaporator 7 is inserted into the air conditioning case 6, the opening portion 54b for receiving the evaporator is covered with a cover (not shown).

An opening portion 55 for receiving the heater-core is formed on the left-hand case 6b. The heater core 8 is inserted into the air conditioning case 6 from the opening portion 55 for receiving the heater core.

The intermediate plate 17 is sandwiched between the right-hand case 6a and the left-hand case 6b. Thus, the first air passage 15 is formed of the space surrounded with the right-hand case 6a and the intermediate plate 17, whereas the second air passage 16 is formed of the space surrounded with the left-hand case 6b and the intermediate plate 17.

The construction of the intermediate plate 17 will be described with reference to FIGS. 4 and 5 more specifically.

Figure 4:
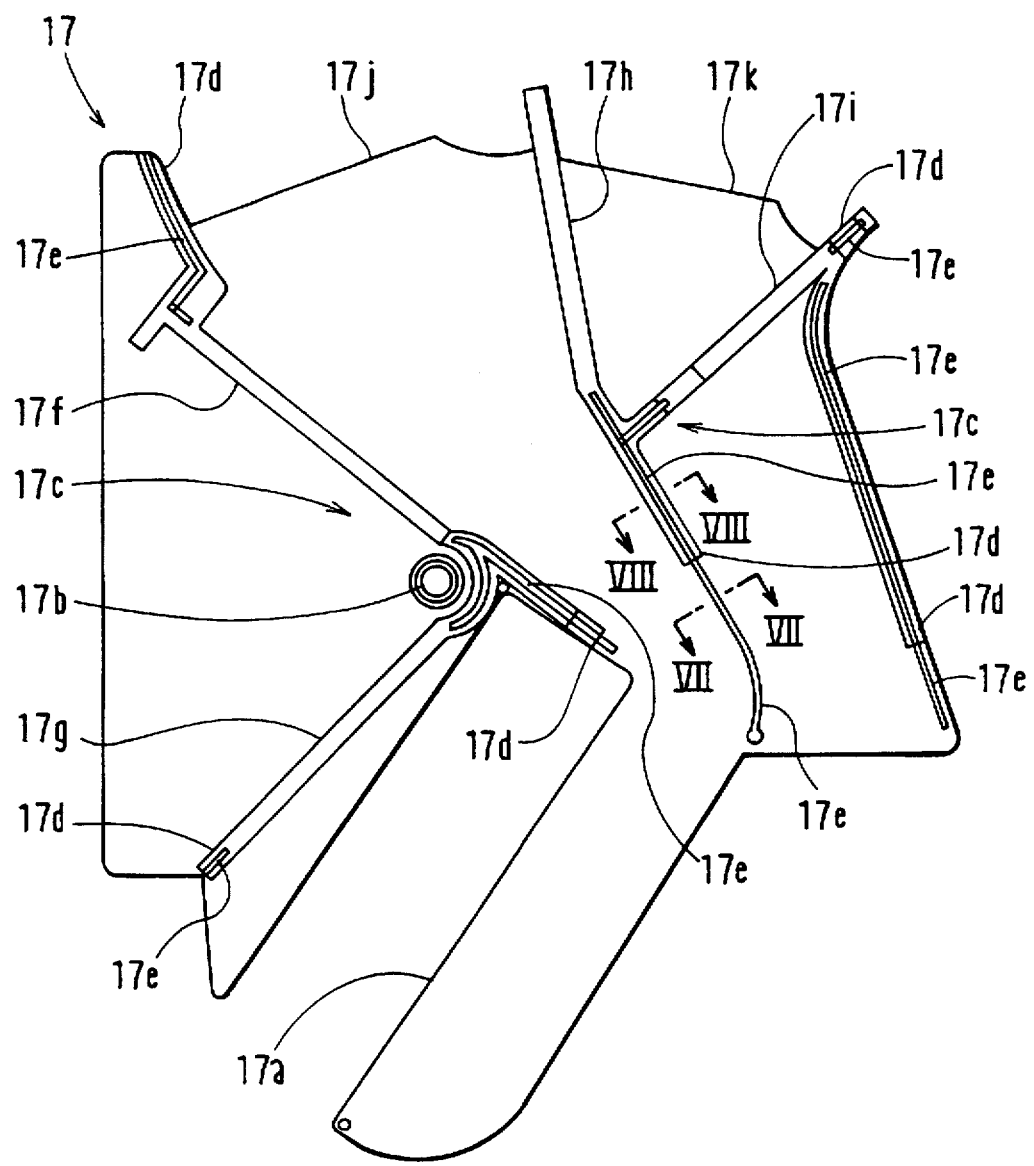
FIG. 4 is a front view showing an intermediate plate according to the embodiment.
Figure 5A:
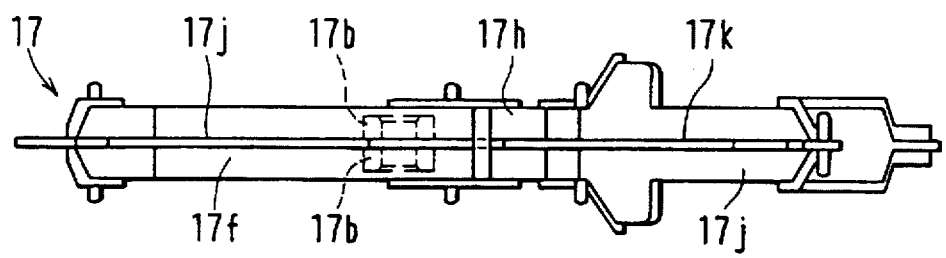
FIG. 5A is a plan view showing the intermediate plate.
Figure 5B:
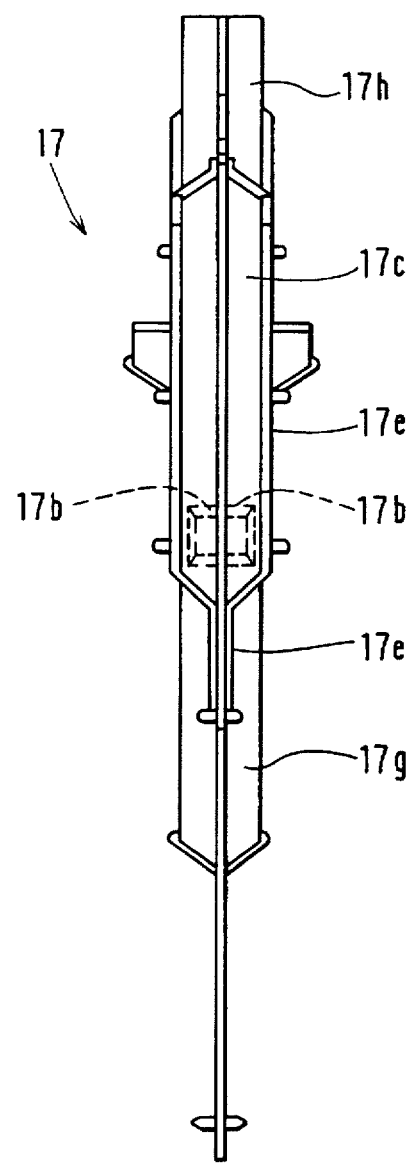
FIG. 5B is a side view showing the intermediate plate.

FIG. 4 is a front view showing the intermediate plate 17. FIG. 5A is a plan view showing the intermediate plate 17 seen from above in FIG. 4. FIG. 5B is a side view showing the intermediate plate 17 seen from the right side in FIG. 4.

As shown in FIG. 4, the intermediate plate 17 has a recess portion 17a formed along the outer configuration of the heater core 8. The heater core 8 is provided so as to pass through the recess portion 17a and is disposed over both the first air passage 15 and the second air passage 16.

A cylindrical portion 17b protrudes from both surfaces of the intermediate plate 17 at a right angle with both surfaces. Each end of the shafts 9a and 10a of the first and second air-mixing door 9 and 10 at the intermediate plate 17 side is fit in the cylindrical portion 17b so that the first and second air-mixing doors 9 and 10 are fixed to the intermediate plate 17.

A protrusion wall 17c protrudes from both surfaces of the intermediate plate 17 at a right angle with both surfaces. In this embodiment, the height of the protrusion wall 17c is 8 mm. The end 17d of the protrusion wall 17c is tapered, as shown in FIG. 6.

A fitting wall 17e protruding perpendicularly from both surfaces of the intermediate plate 17 is formed at the position, sandwiched between the right-hand case 6a and the left-hand case 6b. In this embodiment, the height of the fitting wall 17e is 2.5 mm.

Figure 7:
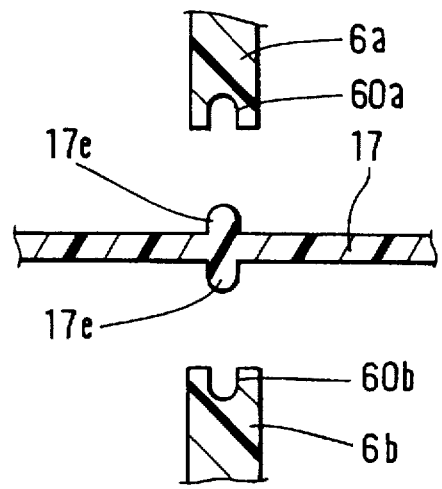
FIG. 7 is a cross sectional view taken along a line VII—VII of FIG. 4.
Figure 8:
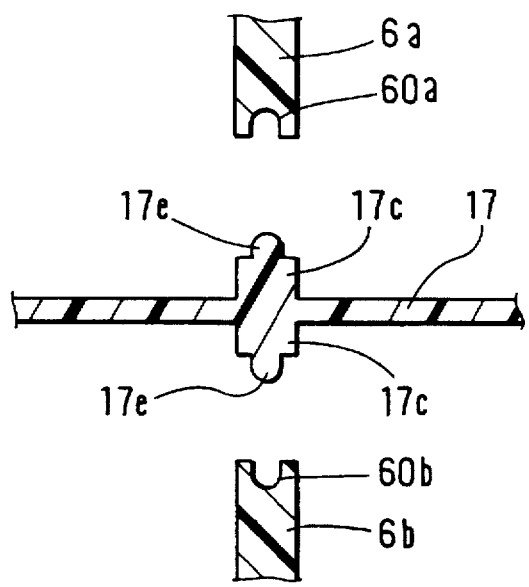
FIG. 8 is a cross sectional view taken along a line VIII—VIII of FIG. 4.

As shown in FIGS. 7 and 8, when the intermediate plate 17 is sandwiched between the right-hand case 6a and the left-hand case 6b, the fitting wall 17e fits into a groove 60a of the right-hand case 6a and a groove 60b of the left-hand case 6b. FIG. 7 is a cross sectional view taken along a line VII—VII of FIG. 4. FIG. 8 is a cross sectional view taken along a line VIII—VIII of FIG. 4.

Figure 6:
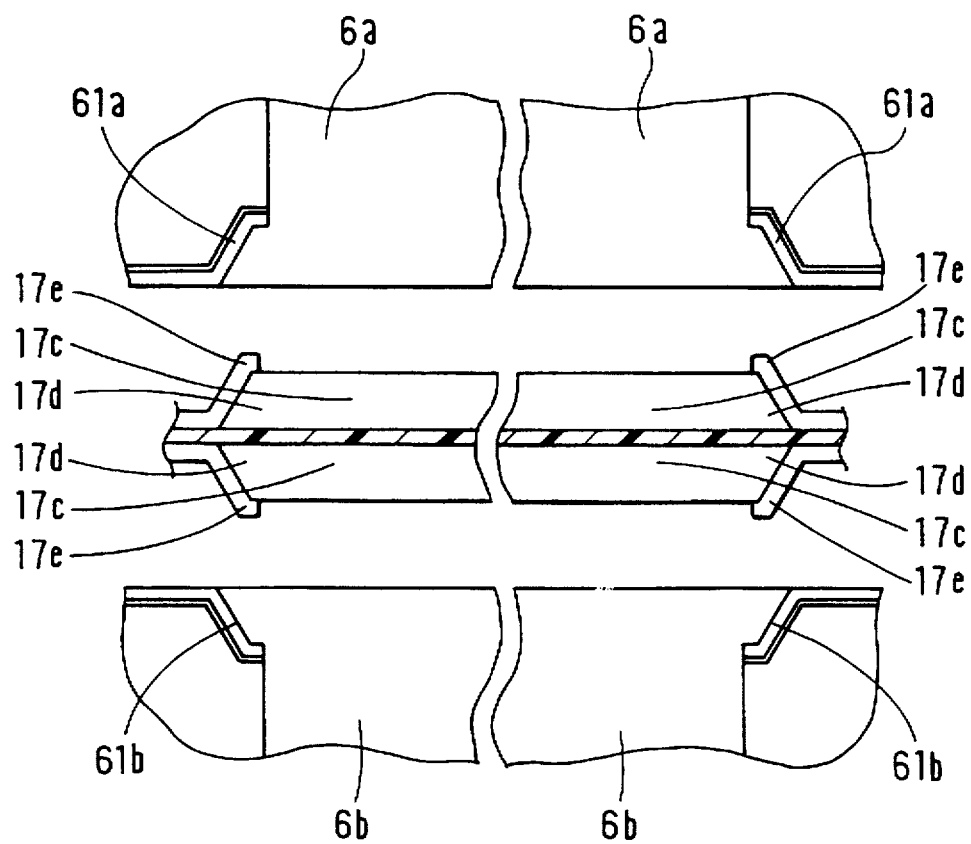
FIG. 6 is a cross sectional view showing a main portion where right-hand and left-hand cases are disassembled according to the embodiment.

As shown in FIG. 6, a portion 61a of the right-hand case 6a and a portion 61b of the left-hand case 6b both fitting to the tapered end 17d of the protrusion wall 17c are tapered in correspondence to the shape of the tapered end 17d. The portions, of the protrusion wall 17c, on which the fitting wall 17e is not formed, are referred to as sealing portions 17f–17i hereinafter in the following description.

Sealing portions (not shown) protrude from each of the inner walls of the right-hand case 6a and the left-hand case 6b at positions corresponding to those of the sealing portions 17f–17i.

Thus, when the first air-mixing door 9 and the second air-mixing door 10 are at the positions shown by the solid lines in FIG. 1, both ends of the first air-mixing door 9 contact with the sealing portion 17f and the sealing portion formed on the right-hand case 6a in correspondence to the sealing portion 17f, and similarly, both ends of the second air-mixing door 10 contact with the sealing portion 17f and the sealing portion formed on the left-hand case 6b in correspondence to the sealing portion 17f. In this manner, the gap between both ends of the first air-mixing door 9 and the right-hand case 6a and the gap between both ends of the first air-mixing door 9 and the intermediate plate 17 are sealed, and similarly, the gap between both ends of the second air-mixing door 10 and the left-hand case 6b and the gap between both ends of the second air-mixing door 10 and the intermediate plate 17 are sealed.

When the first and second air-mixing doors 9 and 10 are at the positions shown by the broken lines in FIG. 1, both ends of the first air-mixing door 9 contact with the sealing portion 17g and the sealing portion formed on the right-hand case 6a in correspondence to the sealing portion 17g, and similarly, both ends of the second air-mixing door 10 contact with the sealing portion 17g and the sealing portion formed on the left-hand case 6b in correspondence to the sealing portion 17g. In this manner, the gap between both ends of the first air-mixing door 9 and the right-hand case 6a and the gap between both ends of the first air-mixing door 9 and the intermediate plate 17 are sealed, and similarly, the gap between both ends of the second air-mixing door 10 and the left-hand case 6b and the gap between both ends of the second air-mixing door 10 and the intermediate plate 17 are sealed.

When the first and second defroster doors 11 and 12 are at the positions shown by the broken lines in FIG. 1, both ends of the first defroster door 11 contact with the sealing portion 17h and the sealing portion formed on the right-hand case 6a in correspondence to the sealing portion 17h, and similarly, both ends of the second defroster door 12 contact with the sealing portion 17h and the sealing portion formed on the left-hand case 6b in correspondence to the sealing portion 17h. In this manner, the gap between both ends of the first air-mixing door 9 and the right-hand case 6a and the gap between both ends of the first air-mixing door 9 and the intermediate plate 17 are sealed, and similarly, the gap between both ends of the second air-mixing door 10 and the left-hand case 6b and the gap between both ends of the second air-mixing door 10 and the intermediate plate 17 are sealed.

When the first and second face/foot switching doors 13 and 14 are at the positions shown by the broken lines in FIG. 1, both ends of the first face/foot switching door 13 contact with the sealing portion 17i and the sealing portion formed on the right-hand case 6a in correspondence to the sealing portion 17i, and similarly, both ends of the second face/foot switching door 14 contact with the sealing portion 17i and the sealing portion formed on the left-hand case 6b in correspondence to the sealing portion 17i. In this manner, the gap between both ends of the first air-mixing door 9 and the right-hand case 6a and the gap between both ends of the first air-mixing door 9 and the intermediate plate 17 are sealed, and similarly, the gap between both ends of the second air-mixing door 10 and the left-hand case 6b and the gap between both ends of the second air-mixing door 10 and the intermediate plate 17 are sealed.

In this embodiment, when the first and second defroster doors 11 and 12 are at the position shown by the solid line of FIG. 1, respectively, sealing members (not shown) installed on the right-hand case 6a and on the left-hand case 6b seal the gap between the right-hand case 6a and both ends of the first defroster door 11 and the gap between the left-hand case 6b and both ends of the second first defroster door 12, respectively. When the first and second face/foot switching doors 13 and 14 are at the position shown by the broken line of FIG. 1, respectively, sealing members (not shown) installed on the right-hand case 6a and on the left-hand case 6b seal the gap between the right-hand case 6a and both ends of the first face/foot switching door 13 and the gap between the left-hand case 6b and both ends of the second face/foot switching door 14, respectively.

A method of molding the intermediate plate 17 will be described.

Polypropylene is filled (injected) into a die unit. After the polypropylene is solidified, the upper and lower dies of the die unit are removed from the solidified polypropylene to release the integrally molded intermediate plate 17.

A method of assembling the air conditioning unit 2 will be described.

Figure 9A:
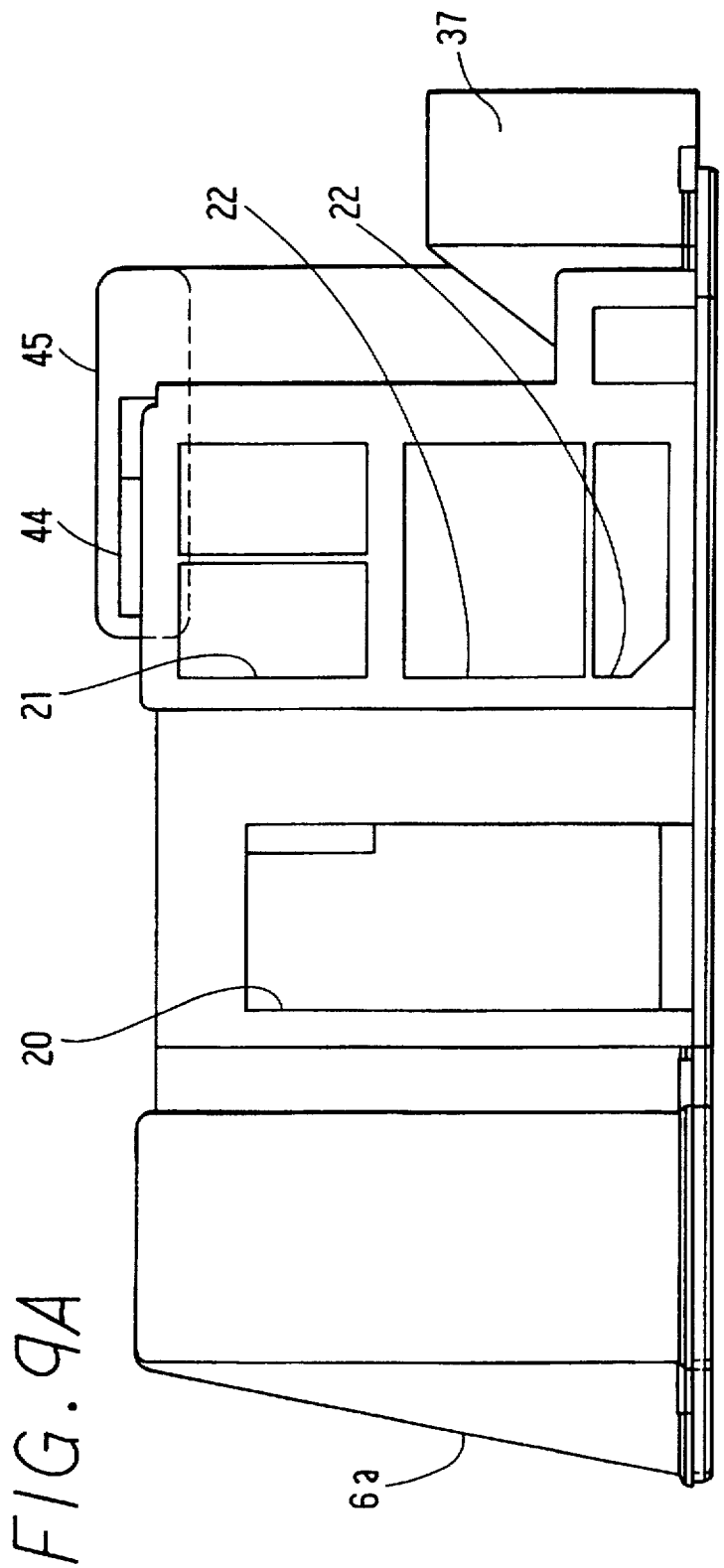
FIGS. 9A and 9B are plan views showing the manner of installing the intermediate plate on the right-hand case.
Figure 9B:
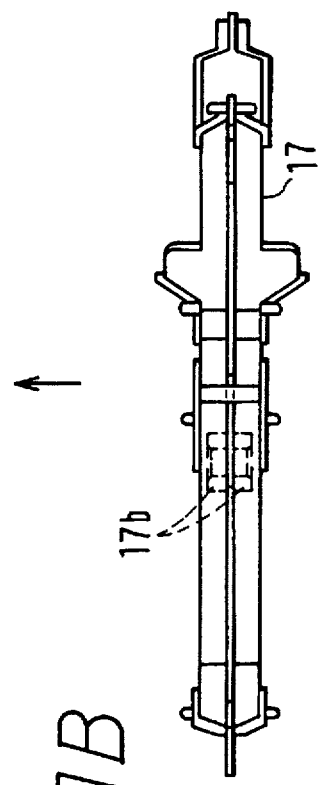

The first air-mixing door 9 is inserted into the right-hand case 6a in a state where the right-hand case 6a is fixed. As shown by an arrow of FIG. 9, the intermediate plate 17 is assembled into the right-hand case 6a by fitting the shaft 9a of the first air-mixing door 9 into the cylindrical portion 17b of the intermediate plate 17.

At this time, the intermediate plate 17 and the right-hand case 6a are assembled in such a manner that the fitting wall 17e of the intermediate plate 17 is fit into the groove 60a of the right-hand case 6a, as shown in FIGS. 7 and 8. Further, as shown in FIG. 6, the portion 61a of the right-hand case 6a fits the tapered end 17d of the protrusion wall 17c.

When the intermediate plate 17 has been assembled in the right-hand case 6a, a first communication hole (not shown) is formed between one end 17j (see FIG. 4) of the intermediate plate 17 and the right-hand case 6a, and a second communication hole (not shown) is formed between one end 17k (see FIG. 4) of the intermediate plate 17 and the right-hand case 6a.

In this embodiment, after the intermediate plate 17 is assembled in the right-hand case 6a, the first and second defroster doors 11 and 12 are inserted into the first communication hole, and the first and second face/foot switching doors 13 and 14 are inserted into the second communication hole.

Then, after the end of the shaft 10a of the second air-mixing door 10 at the intermediate plate side is fit into the cylindrical portion 17b of the intermediate plate 17, the left-hand case 6b is assembled into the right-hand case 6a by fitting the fitting wall 17e of the intermediate plate 17 into the groove 60b of the left-hand case 6b, as shown in FIGS. 7 and 8. At this time, referring to FIG. 6, the portion 61b of the left-hand case 6b fits the tapered end 17d of the protrusion wall 17c.

After the air conditioning case 6 is constructed by assembling the left-hand case 6b to the right-hand case 6a, the evaporator 7 is inserted into the air conditioning case 6 from the opening portion 54b, as shown in FIGS. 2 and 3. Then, the opening portion 54b is covered with the cover. The blower unit 1 shown in FIG. 1 is connected with the opening portion 54a shown in FIGS. 2 and 3. Then, the heater core 8 is inserted into the air conditioning case 6 from the opening portion 55.

As described above, in this embodiment, since the sealing portions 17f–17i are formed on the intermediate plate 17, these sealing portions 17f–17i can be formed easily as compared with the case where these sealing portions 17f–17i are formed on the air conditioning case 6.

The sealing portions 17f–17i are formed on the intermediate plate 17. Thus, when the air-mixing doors 9 and 10 are at the positions shown by the solid lines in FIG. 1, these doors 9 and 10 contact with the sealing portion 17f, and when the doors 9 and 10 are at the positions shown by the one-dot chain line in FIG. 1, these doors 9 and 10 contact with the sealing portion 17g. When the defroster doors 11 and 12 are at the positions shown by the broken lines in FIG. 1, these doors 11 and 12 contact with the sealing portion 17h. When the face/foot switching doors 13 and 14 are at the positions shown by the solid lines in FIG. 1, these doors 13 and 14 contact with the sealing portion 17i. In this manner, the gaps between the intermediate plate 17 and each of the doors 9–14 are sealed. Accordingly, air can be prevented from leaking from the gaps.

In this embodiment, because the wall-shaped sealing portions 17f–17i are formed on the plate-shaped intermediate plate 17, the intermediate plate 17 has a high degree of rigidity.

Further, because the intermediate plate 17 can be integrally molded by a die unit and released therefrom easily, the sealing portions 17f–17i can be integrally molded with the intermediate plate 17. It is effective in view of reducing the number of parts, the manufacturing process, and the like.

Because the intermediate plate 17 is installed on the right-hand and left-hand cases 6a and 6b by being sandwiched therebetween, the intermediate plate 17 can be attached to or detached from the air conditioning case 6 easily.

Accordingly, the air conditioning apparatus of the embodiment can be employed to independently adjust each temperature-of the driver's seat and the passenger's seat by attaching the intermediate plate 17 on the air conditioning case 6. Further, the air conditioning apparatus can be also employed to adjust the temperatures of the respective seats in the same way by detaching the intermediate plate 17 from the air conditioning case 6.

Moreover, in this embodiment, because the fitting wall 17e fits into the groove 60a of the right-hand case 6a and the groove 60b of the left-hand case 6b when the intermediate plate 17 is sandwiched between the right-hand case 6a and the left-hand case 6b, the intermediate plate 17 and the right-hand and left-hand cases 6a and 6b can be fixedly positioned to each other easily.

Further, in the embodiment, the end 17d of the protrusion wall 17c is tapered, and the portion 61a of the right-hand case 6a and the portion 61b of the left-hand case 6b, both of which fit to the tapered end 17d are tapered in correspondence to the shape of the tapered end 17d. Therefore, the intermediate plate 17 can be smoothly assembled into the right-hand case 6a and the left-hand case 6b.

Although the sealing portions 17f–17i are molded integrally with the intermediate plate 17, these portions may be separate from the intermediate plate 17.

Although the air conditioning apparatus of the present invention is mounted on the vehicle in the embodiment, it may be employed for home use.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. An air conditioning apparatus for a vehicle having a passenger compartment including a first air conditioning zone and a second air conditioning zone, said air conditioning apparatus comprising:

an air conditioning case having an air passage therein, for introducing conditioned air into said first and second air conditioning zones;

a partitioning member for partitioning said air passage into a first air passage communicating with said first air conditioning zone and a second air passage communicating with said second air conditioning zone;

a first door provided in said first air passage, for closing a predetermined air flow path formed in said first air passage;

a second door provided in said second air passage, for closing a predetermined air flow path formed in said second air passage; and a sealing portion protruding from both surfaces of said partitioning member, said sealing portion contacting with said first and second doors to seal a gap between said partitioning member and each of said first and second doors when said first and second doors close respective said predetermined air flow paths.

2. An air conditioning apparatus according to claim 1, wherein said sealing portion is formed in a wall shape.

3. An air conditioning apparatus according to claim 1, wherein said sealing portion is integrally molded with said partitioning member.

4. An air conditioning apparatus according to claim 1, wherein,
said air conditioning case includes a first case at a side of said first air passage and a second case at a side of said second air passage side; and
said partitioning member is sandwiched between said first and second cases.

5. An air conditioning apparatus according to claim 4, wherein,
said partitioning member includes a fitting wall protruding from both surfaces of said partitioning member; and
each of said first and second cases includes a groove into which said fitting wall is fit when said partitioning member is sandwiched between said first and second cases.

6. An air conditioning apparatus according to claim 1, wherein said first air conditioning zone is a space at a driver's seat side, and said second air conditioning zone is a space at a passenger's seat side.

7. An air conditioning apparatus according to claim 1, wherein,
said partitioning member includes a protruding wall protruding from both surfaces of said partitioning member and having a taper-shaped end portion; and
said air conditioning case comprising first and second cases includes a taper-shaped portion to which said taper-shaped end portion is fit when said partitioning member is sandwiched between said first and second cases.

8. An air conditioning apparatus according to claim 1, further comprising:
a cooling heat exchanger disposed in each of said first and second air passages, for cooling air therethrough,
a heating heat exchanger disposed in each of said first and second air passages at a downstream air side of said cooling heat exchanger, for heating air therethrough,
wherein each of said first and second doors is disposed between said cooling heat exchanger and said heating heat exchanger to adjust an amount of cool air cooled by said cooling heat exchanger into said heating heat exchanger.

9. An air conditioning apparatus according to claim 1, wherein,
said each of said first and second air passages includes a defroster opening portion which is open toward an inner surface of a windshield in said passenger compartment, and
said each of said first and second doors closes respective defroster opening portions.

10. An air conditioning apparatus according to claim 1, wherein,
said each of said first and second air passages includes a face opening portion which is open toward a space around a face of a passenger in said passenger compartment and a foot opening portion which is open toward a space around feet of a passenger in said passenger compartment, and
said each of said first and second doors selectively closes respective defroster opening portions and foot opening portions.

11. An air conditioning apparatus according to claim 1, wherein each of said first and second doors are rotatably operated.

* * * * *